US008555344B1

(12) United States Patent
Wiedmann et al.

(10) Patent No.: US 8,555,344 B1
(45) Date of Patent: Oct. 8, 2013

(54) METHODS AND SYSTEMS FOR FALLBACK MODES OF OPERATION WITHIN WIRELESS COMPUTER NETWORKS

(75) Inventors: Ulrich Wiedmann, Redwood City, CA (US); Terrance L. Lillie, Redwood City, CA (US); Richard P. Sneiderman, Sunnyvale, CA (US); Christian Wiedmann, Redwood City, CA (US); Robert Zeljko, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 1507 days.

(21) Appl. No.: 10/861,610

(22) Filed: Jun. 4, 2004

Related U.S. Application Data (60) Provisional application No. 60/476,402, filed on Jun. 5, 2003.

(51) Int. Cl.
| | | |
|---|---|---|
| G06F 7/04 | (2006.01) | |
| G06F 15/16 | (2006.01) | |
| G06F 17/30 | (2006.01) | |
| G06F 12/00 | (2006.01) | |
| G06F 12/14 | (2006.01) | |
| G06F 13/00 | (2006.01) | |
| G06F 15/173 | (2006.01) | |
| H04L 29/06 | (2006.01) | |
| H04L 9/32 | (2006.01) | |
| G11C 7/00 | (2006.01) | |

(52) U.S. Cl.
USPC ...... 726/4; 726/5; 726/17; 713/168; 713/175; 709/225; 709/229

(58) Field of Classification Search
USPC ............ 709/225, 229; 713/168, 175; 726/4, 726/5, 17
See application file for complete search history.

(56) References Cited

U.S. PATENT DOCUMENTS

| | | | | |
|---|---|---|---|---|
| 6,199,161 | B1 * | 3/2001 | Ahvenainen | 713/155 |
| 6,965,674 | B2 * | 11/2005 | Whelan et al. | 380/270 |
| 7,155,167 | B1 * | 12/2006 | Carty | 455/67.11 |
| 7,188,359 | B2 * | 3/2007 | Toomey | 726/3 |

(Continued)

FOREIGN PATENT DOCUMENTS

| | | |
|---|---|---|
| EP | 1111874 A1 | 6/2001 |
| WO | 0133883 A1 | 5/2001 |
| WO | 0147191 A1 | 6/2001 |

OTHER PUBLICATIONS

RFC 2748 The COPS (Common Open Policy Service) Protocol Jan. 2000.*

Qiao, D. et al., Goodput Analysis and Link Adaptation for IEEE 802.11a Wireless LANs, IEEE Transactions on Mobile Computing, vol. 1, No. 4, pp. 278-292, Oct.-Dec. 2002, USA.

(Continued)

*Primary Examiner* — Kambiz Zand
*Assistant Examiner* — Benjamin Kaplan
(74) *Attorney, Agent, or Firm* — Wong, Cabello, Lutsch, Rutherford & Brucculeri, LLP (57) ABSTRACT

Described herein are systems and methods for fallback operation within WLANs that rely on remote authentication procedures. When a primary network node authentication process fails, fallback access control parameters associated with a secondary network node authentication process are exchanged between a network node and an authentication server, wherein the secondary network node authentication process allows the network node to access other resources of a computer network.

22 Claims, 6 Drawing Sheets

(56) References Cited

U.S. PATENT DOCUMENTS

| | | | |
|---|---|---|---|
| 7,240,364 B1* | 7/2007 | Branscomb et al. | 726/9 |
| 7,284,062 B2* | 10/2007 | Krantz et al. | 709/229 |
| 2001/0024443 A1 | 9/2001 | Alriksson et al. | |
| 2003/0050068 A1 | 3/2003 | Woxberg et al. | |
| 2004/0049699 A1* | 3/2004 | Griffith et al. | 713/201 |
| 2004/0111520 A1* | 6/2004 | Krantz et al. | 709/229 |
| 2004/0122960 A1* | 6/2004 | Hall et al. | 709/229 |
| 2004/0123140 A1* | 6/2004 | Toomey | 713/201 |
| 2004/0179690 A1* | 9/2004 | Soliman | 380/277 |

OTHER PUBLICATIONS

Pagtzis, T. et al., Operational and Fairness Issues with Connectionless Traffic over IEEE802.11b, IEEE International Conference on Communications, vol. 6, pp. 1905-1913, Jun. 11-14, 2001, Piscataway, New Jersey, USA.

Wireless Security Corporation Unveils Unique Wi-Fi Security Solution for Wireless LANs; WSC Guard Enables Companies of All Sizes to Safely Join the Wireless Revolution, Business Wire, Oct. 8, 2003, Palo Alto, California, High Beam Research, http://www.highbeam.com/doc/1G1-108625366.html.

\* cited by examiner

METHODS AND SYSTEMS FOR FALLBACK MODES OF OPERATION WITHIN WIRELESS COMPUTER NETWORKS

The present application is related to, incorporates by reference and claims the priority benefit of U.S. Provisional Application 60/476,402, entitled "FALLBACK MODES OF OPERATION WITHIN WIRELESS COMPUTER NETWORKS", filed Jun. 5, 2003.

FIELD OF THE INVENTION

The present invention relates to various modes of operation within wireless computer networks that employ remote authentication devices.

BACKGROUND

Wireless local area networks (WLANs), such as those based on the IEEE 802.11a, 802.11b and 802.11g standards, are becoming ubiquitous in business, government and small office/home office (SOHO) settings because of the freedom afforded by and the decreasing costs of the underlying technology. Current security mechanisms for maintaining the confidentiality, integrity, and availability of wireless communications within such networks are, however, flawed. For example, although the above-cited IEEE standards specify both an authentication service and encryption protocol for wireless networks, methods for compromising these security measures have been well publicized. In response, the community of wireless network equipment developers and vendors has started to adopt the authentication procedures outlined in the 2001 IEEE 802.1x standard entitled "Port Based Network Access Control" in an effort to provide solutions to these security defects. The facilities needed to deploy such access control measures, however, are both expensive and difficult for unsophisticated users to implement.

Figure 1:
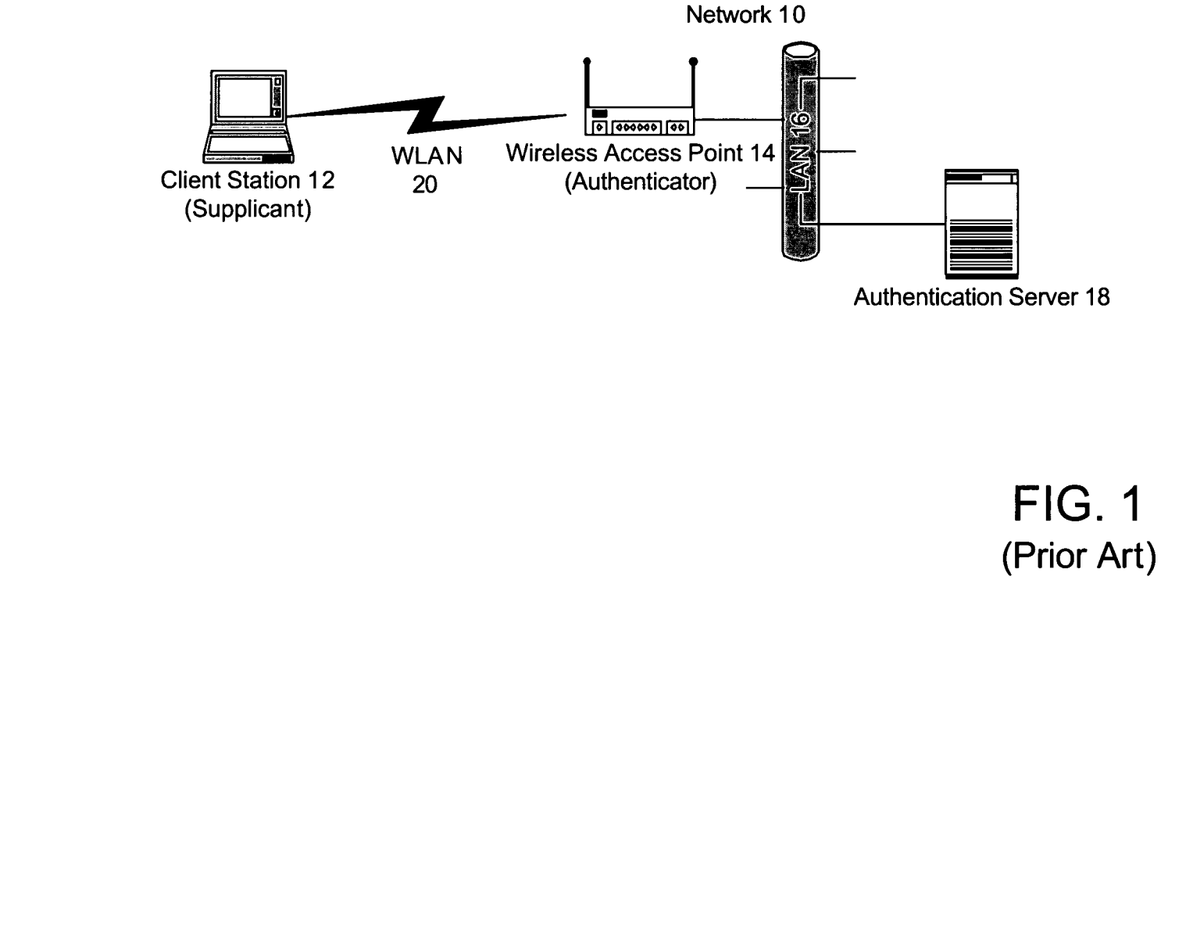
FIG. 1 illustrates an exemplary prior art network including a WLAN.

Before discussing the 802.1x access control mechanisms in detail, it is helpful to review some basics of WLANs in general. Unlike their wired LAN counterparts, WLANs provide for communication among network elements through wireless transmissions (e.g., radio transmissions), as opposed to wired, physical connections. FIG. 1 illustrates an exemplary prior art network 10 including a WLAN. In 802.11-based WLANs, clients or "stations" 12 (i.e., computers with wireless network interface cards (NICs)) interact with other network devices (printers, file servers, other clients, etc.) through access points (APs) 14, which act as bridges between the wired network 16 and wireless network 20. In some cases, wireless clients 12 may communicate directly with one another, without the use of APs.

The 802.1x standard does not itself specify any type of encryption procedures to be used within a network. To date, however, several equipment vendors have offered proprietary versions of dynamic key management for WLANs, using 802.1x as a delivery mechanism. In addition, the Wi-Fi Alliance (a non-profit industry consortium) has included 802.1x in its WPA security standard. Through dynamic key exchanges the authentication server 18 can return individual session keys to an AP 14 as part of the authentication process and these session keys can then be used for encrypted communications between the AP 14 and its clients 12. Dynamic key management provides a more secure environment than is typically found in an 802.11 WLAN because the use of multiple keys that are changed more frequently than is the case for a static key of an ordinary 802.11 network minimizes the opportunity for unauthorized users to uncover the keys.

Unfortunately, implementing an 802.1x solution for a WLAN is not an easy task. For example, the required network infrastructure is complex (potentially involving multiple authentication servers for use in cases of equipment failures) and expensive. In addition, installing the necessary hardware and software in the network and nodes thereof generally cannot be undertaken by unsophisticated users. Consequently, deployment of 802.1x compliant WLANs has not yet become widespread at an enterprise level and is virtually nonexistent at a SOHO level.

SUMMARY OF THE INVENTION

Methods and apparatus for fallback operation within WLANs that rely on remote authentication procedures are described. In one embodiment, when a primary network node authentication process fails, fallback access control parameters associated with a secondary network node authentication process are exchanged between a network node and an authentication server, wherein the secondary network node authentication process allows the network node to access other resources (e.g., Internet resources) of a computer network.

The primary and secondary authentication processes may make use of any such process, for example EAP TTLS, EAP TLS or PEAP. Alternatively, or in addition, the authentication process may require the network node and the authentication server (e.g., a RADIUS server) to identify themselves to one another using digital certificates and/or using a password. In other cases, the authentication processes may provide for only the network node to be authenticated on the basis of a password. In various embodiments, the authentication process may make use of a secure channel, for example a channel that is both encrypted and integrity-protected, and may include an exchange of encryption keys for use between the access point and the network node. In one embodiment, the authentication server is a RADIUS server.

Exchanging fallback access control parameters may involve programming an access point with a fallback WEP key by a second network node; and/or distributing a WPA pre-shared key to an access point by a second network node. The fallback access control parameters are exchanged when the access point is initially installed in the network or when the network node initially connects to the access point. The second network node can be the authentication server, a network server connected to the network, a client connected to the network, the network node, or the access point.

The access point can be programmed with a plurality of unique WEP or WPA keys for a plurality of client-access point pairs where the unique keys are associated with MAC addresses of clients of the client-access point pairs. The fallback access control parameters (e.g., the fallback WEP or WPA keys) are exchanged periodically (e.g., hourly, daily, weekly and monthly). Additionally, the access point can retrieve the fallback key whenever communication with the authentication server is lost and then reestablished.

The primary network node authentication process may fail when an access point's connection to the network is unavailable; or when the authentication server's connection to the network is unavailable. The failure situation can be detected using a network fallback agent. The network agent initiates procedures for exchanging the fallback access control parameters. The procedures can include periodically testing the authentication server's connection to the network by sending dummy requests for authentication, and/or keep-alive messages. In one particular embodiment, the access point can be reconfigured using the network fallback agent through an HTTP configuration interface and/or SNMP configuration interface. The network fallback agent is instantiated in any of the authentication server, a network server connected to the network, a client connected to the network, the network node, and firmware of the access point.

BRIEF DESCRIPTION OF THE DRAWINGS

A better understanding of the present invention can be obtained from the following detailed description in conjunction with the following drawings, in which.

DETAILED DESCRIPTION

Described herein are methods for fallback operation within WLANs that rely on remote authentication procedures. In the following discussion, much of the information is described in terms of processes and procedures to be implemented by one or more computer systems executing appropriate algorithms which are embodiments of the present invention. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the actions and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices. Moreover, as used herein, the term table can refer to any data structure.

As mentioned above, security in IEEE 802.11 networks is provided by an authentication service and an optional encryption protocol. The encryption protocol is known as WEP (wired equivalent privacy) and is a link-layer security protocol based on the RC4 stream cipher, a symmetric cipher where the same key is used for both encryption and decryption. WEP was intended to provide confidentiality for wireless communications, through the use of encryption; access control for a network, through the option to discard improperly encrypted packets; and data integrity, through the use of a checksum. Unfortunately, however, WEP has been shown to have fundamental flaws (including flaws that allow hackers to uncover the actual cipher keys) which can be exploited to allow unauthorized clients to gain access to an 802.11 WLAN.

Likewise, the authentication process used in 802.11 WLANs is insecure. A client must authenticate and establish an association with an AP 14 prior to transmitting data. An association is simply a binding between the client 12 and an AP 14. The 802.11 standards provide for two types of authentication: open systems authentication and shared-key authentication.

Open systems authentication is usually the default mode of operation and allows any client 12 to associate with an AP 14 as long as the network identifiers (termed "SSID" or service set identification) used by the client 12 and the AP 14 match. Consequently, anyone who knows the SSID of a network can configure a client to be authenticated by an AP 14 on that network. Thus, because such SSIDs are broadcast by APs 14 in the clear as part of their beacon transmissions; open system authentication provides no security whatsoever.

Shared-key authentication is a one-way authentication mechanism used to provide more stringent access to network resources. The term "one-way" authentication is used because although the AP 14 must authenticate the client, there is no provision for a client to authenticate an AP 14. In a shared-key network a client 12 seeking to associate with an AP 14 must successfully encrypt a challenge string issued by the AP 14 before being authenticated. However, because it is the WEP key (and not a different authentication key) that is used in this process, shared-key authentication is really no more secure than WEP itself. Consequently, because WEP keys can be uncovered simply by monitoring transmissions within a WLAN, shared-key authentication networks are also vulnerable to attack.

Recognizing these flaws in 802.11 WLANs, some AP equipment vendors have added an additional security layer in the form of an access control list based on client MAC addresses. In such cases, the AP 14 allows only those clients with authorized MAC addresses to create an association. However, such MAC-address filters are somewhat time consuming to establish and maintain and, consequently, are not often used.

Given the weakness of current 802.11 security mechanisms, some equipment vendors and network operators have begun to implement WLAN access control based on the relatively new IEEE 802.1x standard. The 802.1x standard provides mechanisms for client authentication, network access control, and cryptographic key management within any network (i.e., whether it is a wired or wireless LAN). These mechanisms are based upon an existing authentication protocol known as the Extensible Authentication Protocol (EAP), which is specified in various Internet Engineering Task Force (IETF) Requests For Comments (RFCs). In 802.1x parlance, clients 12 seek access to a network through an authenticator (usually an AP 14 in the case of a WLAN), which refers such requests to an authentication server 18. In practice, the authentication server 18 is usually a Remote Authentication Dial-In User Service (RADIUS) server, although RADIUS is not specifically required by the 802.1x standard. Only if the authentication server verifies the client's 12 identity will the AP 14 allow the client 12 to access other network resources.

What is needed therefore are mechanisms to allow for more widespread deployment of this technology to provide enhanced security for new and existing WLANs. As indicated above, the 802.1x specification provides a procedure for network client authentication. In the context of wireless networks, such authentication is performed via an AP 14 and an authentication server 18, usually a RADIUS server.

Figure 2:
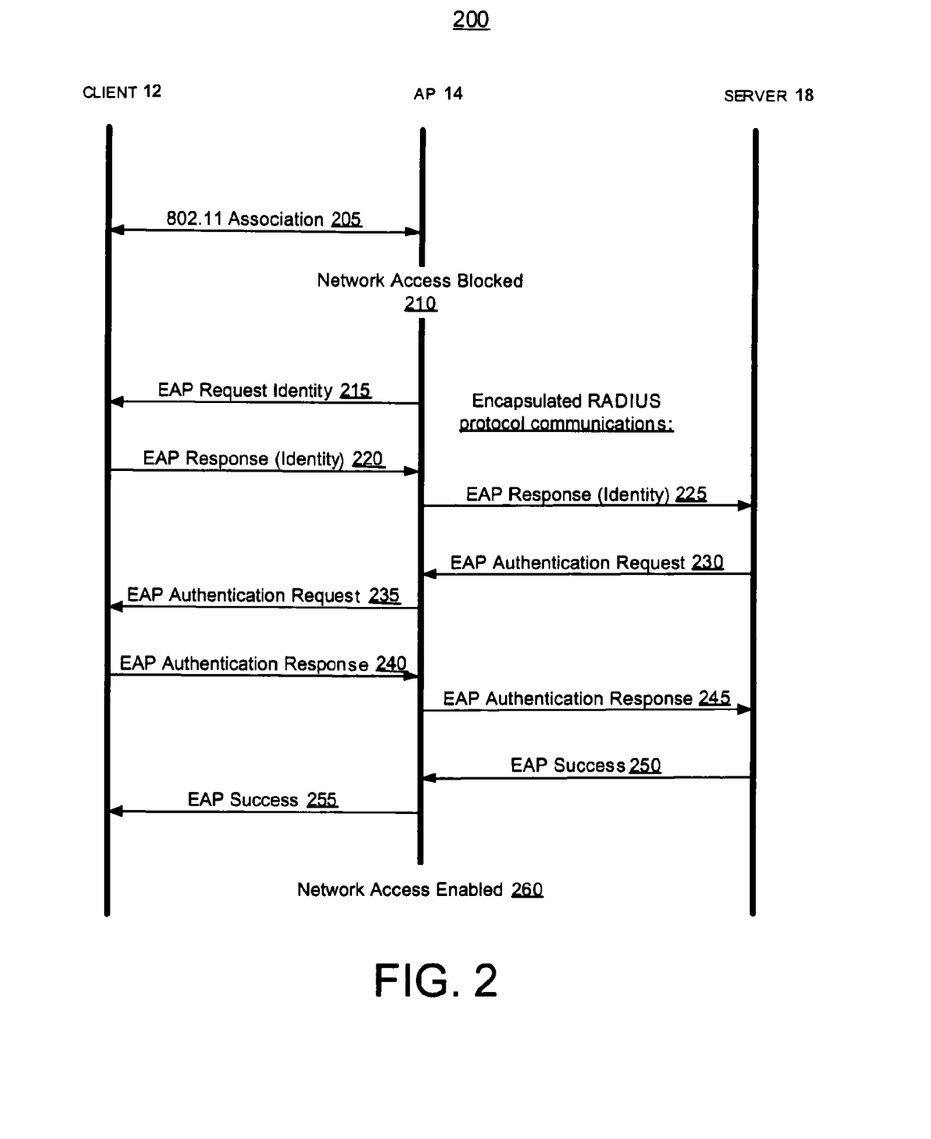
FIG. 2 illustrates the basic authentication process in a typical network, according to one embodiment.

FIG. 2 illustrates the basic authentication process 200 in a typical network, according to one embodiment. As the diagram illustrates, the client 12 (called the supplicant in 802.1x terminology) first establishes an association with the AP 14 (the authenticator) using the conventional 802.11 procedures (step 205). At this point, however, the AP 14 prevents the client 12 from further accessing network resources until the client is authenticated (step 210). The authentication process begins with the AP 14 transmitting an EAP request for the client's identity (credentials) (step 215) and the client 12 providing a response (step 220). These messages are encapsulated within wireless LAN frames in a process referred to as EAP over LAN.

Thereafter, the EAP information provided by the client 12 is passed by the AP 14 to an authentication server (e.g., a RADIUS server) 18 over the wired LAN 16 (step 225). This time, the EAP information is encapsulated within a packet that conforms to the RADIUS protocol (a process known as EAP over RADIUS). The authentication server 18 then begins a dialog with the AP 14. The exact details of this exchange vary depending upon which authentication process is used in the network 10, but of importance to the present discussion is the need for the authentication server 18 to properly identify the AP 14 (step 230). The EAP authentication request is sent to the client 12 (step 235). The client 12 provides an EAP authentication response (step 240) to the AP 14. The AP 14 passes the authentication response to the authentication server 18 (step 245). Unless the AP 14 is properly identified, the authentication server 18 cannot process the authentication request. Assuming the AP 14 is properly identified (step 250), the authentication server 18 provides the information necessary to verify the client's identity (and in some cases, vice versa) (step 255), and the client 12 is granted access to the network via AP 14 (step 260).

Various authentication procedures which might be used in such an authentication scheme include EAP-TLS (transport level security), in which both the client and the authentication server identify themselves to one another using digital certificates; EAP-TTLS (tunneled TLS), in which the client and authentication server identify themselves to one another but only the server has a digital certificate; EAP-SRP (secure remote password), in which both devices are authenticated using a password; EAP-MD5, in which only the client is authenticated by the server on the basis of a password; and protected EAP (PEAP), which uses a secure channel. In the EAP-TLS, EAP-TTLS and EAP-SRP processes, encryption keys for use between the AP 14 and the client 12 are generated as part of the exchange. In PEAP, a secure channel that is both encrypted and integrity-protected with TLS is created and then a new EAP negotiation with another EAP type occurs, authenticating the network access attempt of the client. Because the TLS channel protects EAP negotiation and authentication for the network access attempt, password-based authentication protocols that are normally susceptible to an offline dictionary attack can be used for authentication.

Regardless of the authentication method used, however, conventional authentication techniques employing RADIUS servers require that the AP 14 be identified using its Internet Protocol (IP) addresses. This EP address is used for a variety of reasons, most importantly to look up the shared secret that is used to protect communications between the AP 14 and the authentication server 18. Thus, the procedure cannot be used where AP IP addresses are subject to change, for example as would occur when the authentication server 18 is connected to private network 10 through a device which performs network address translation. An example of a situation in which an AP might have an IP address that is subject to change involves connecting the LAN 16 to the authentication server 18 via the Internet.

A RADIUS server generally is not connected to the private LAN directly since it may not be economically feasible for a network operator to do so. As mentioned above, deploying such a network is a costly and technically complex proposition. Therefore, it is an aspect of the present invention to provide a remote authentication mechanism for private LAN owners/operators that may be utilized on a fee for service or other basis. In this model, LAN owners/operators are spared the cost of purchasing, installing and maintaining expensive server resources and instead may lease the authentication services from a third party provider.

Figure 3:
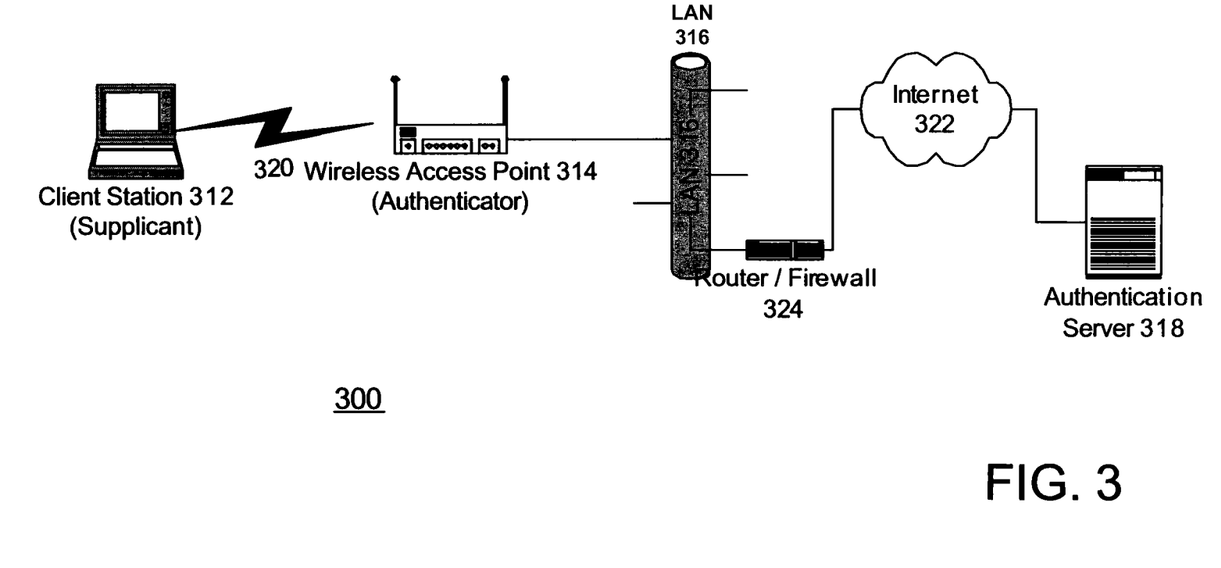
FIG. 3 illustrates an exemplary network having a wireless local area network configured for remote authentication, according to one embodiment of the present invention.

FIG. 3 illustrates an exemplary network 300 having a wireless local area network configured for remote authentication, according to one embodiment of the present invention. According to this embodiment, the private LAN 316 is connected to the Internet 322 via a router 324. Router 324 may include a firewall application, or the firewall may be executing on a separate machine. The firewall acts as a filter that prevents unauthorized users from gaining access to private LAN 316 and its resources.

Connected between LAN 316 and the Internet 322, router 324 directs network traffic (i.e., packets) according to its programmed routing tables. As part of this process, router 324 usually performs network address translation (NAT), without which the multiple nodes of LAN 316 could not share the single address on the Internet 322. NAT of course involves the substitution of a LAN node's true IP address for a "masquerade" address provided by router 324, thus the IP address of AP 314 is hidden to outside resources (such as authentication server 318) and cannot serve as an effective identifier outside of LAN 316.

Other network configurations may involve APs 314 being assigned IP addresses dynamically. That is, a particular AP 314 may not identify itself using the same IP address each time it tries to provide a connection to a private network. This would represent another instance in which the use of an IP address to identify an AP 314 to the authentication server (whether remote or local to LAN 316) would be unsatisfactory.

In order to allow for these types of network configurations (i.e., the use of a remote authentication server 318 and/or networks in which APs 314 may be assigned different IP addresses from time to time), the present method and system involves utilizing an AP identifier other than an IP address in connection with the authentication process. Any AP parameter that remains unchanged may be used, however, in one embodiment, an AP's MAC (media access controller) address, rather than its IP address is used in connection with such authentication. The MAC address is a parameter that is not affected by NAT when an AP 314 establishes a connection to the authentication server 318 via router 324. In other embodiments, other unique AP identifiers that could be passed unchanged from the AP 314 to the authentication server 318 as part of the authentication process may be used.

In order for the AP's MAC address to be passed from the AP 314 to the authentication server 318, the MAC address will need to be included in the EAP over RADIUS messages passed between these devices. The RADIUS protocol provides one or more existing fields within which such information may be provided. For example, the RADIUS protocol specifies a "Called-Station-ID" attribute, which was originally intended to identify the telephone number that a client was calling in order to establish a connection to a network. RADIUS was originally intended to support authentication of dial-up users, hence the need for such information. In the present context, however, this parameter is unnecessary and so the AP 314 could be modified to insert its MAC address in place of such a telephone number. Alternatively, other attributes of the RADIUS protocol that are otherwise unused in the authentication exchange between AP 314 and server 318 could be used for this purpose.

Figure 4:
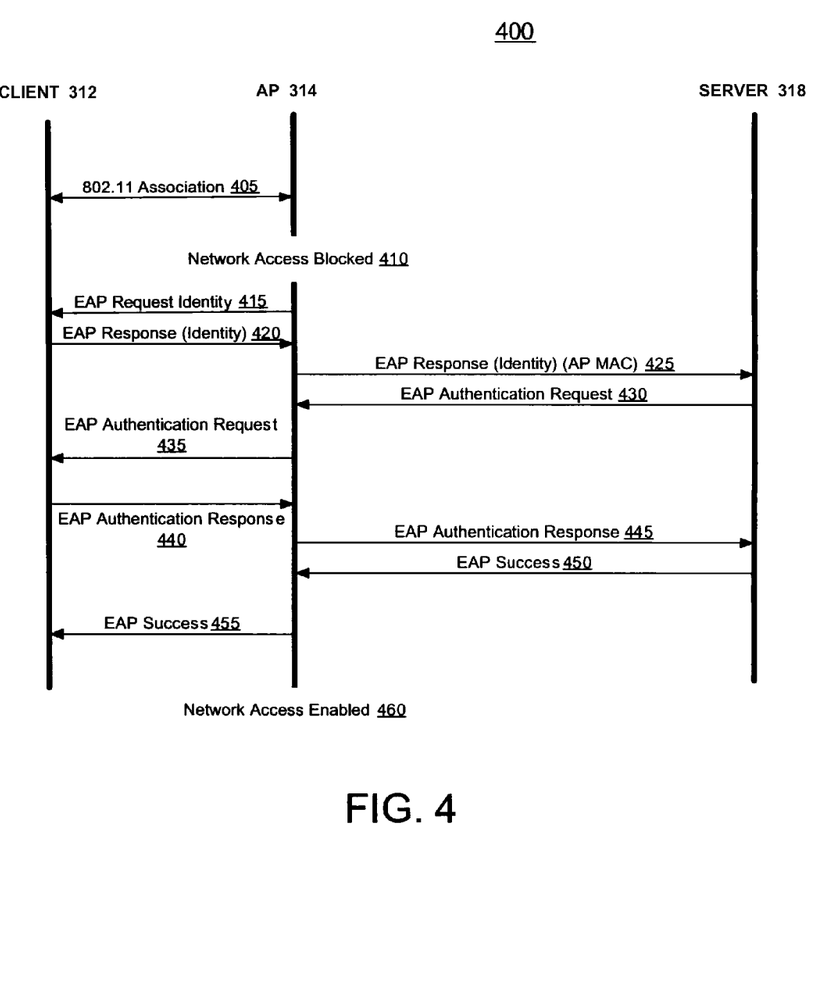
FIG. 4 illustrates an authentication process in a network, according to one embodiment of the present invention.

FIG. 4 illustrates an authentication process 400 in a network 300, according to one embodiment of the present invention. As the diagram illustrates, the client 312 first establishes an association with the AP 314 (the authenticator) using the conventional 802.11 procedures (step 405). At this point, however, the AP 314 prevents the client 312 from further accessing network resources until the client is authenticated (step 410). The authentication process begins with the AP 314 transmitting an EAP request for the client's identity (credentials) (step 415) and the client 312 providing a response (step 420). These messages are encapsulated within wireless LAN frames in a process referred to as EAP over LAN.

Thereafter, the EAP information provided by the client 312 is passed by the AP 314 to an authentication server (e.g., a RADIUS server) 318 over the wired LAN 316 (step 425). This time, the EAP information is encapsulated within a packet that conforms to the RADIUS protocol (a process known as EAP over RADIUS). The authentication server 318 then begins a dialog with the AP 314. The authentication server 318 is configured to initiate its authentication procedures using the AP's MAC address rather than the "masquerade" IP address provided by router 324. Once the AP 314 is identified on the basis of its MAC address (or other unique identifying parameter), the authentication server 318 may determine which LAN 316 is involved (e.g., via a table lookup to associate the AP MAC address with a particular LAN) and identify which authentication process to use for the client 312 that is now requesting access to that LAN. The authentication server 318 properly identifies the AP 314 (step 430) via its MAC address. The EAP authentication request is sent to the client 312 (step 435). The client 312 provides an EAP authentication response (step 440) to the AP 314. The AP 314 passes the authentication response to the authentication server 318 (step 445). Unless the AP 314 is properly identified, the authentication server 318 cannot process the authentication request. Assuming the AP 314 is properly identified (step 450), the authentication server 318 provides the information necessary to verify the client's identity (and in some cases, vice versa) (step 455), and the client 312 is granted access to the network via AP 314 (step 460).

In another embodiment, a software application executing on the client 312 may be configured to add the client's 312 and the AP's 314 MAC addresses to the username to be used for authentication. This way, the AP 314 does not need to be modified to add this information to a RADIUS field. Such a mechanism is useful for APs 314 that support 802.1x but which do not pass MAC addresses for the AP 314 or the client 312 as part of the authentication message exchange.

Once the AP 314 is identified on the basis of its MAC address (or other unique identifying parameter), the authentication server 318 may determine which LAN 316 is involved (e.g., via a table lookup to associate the AP MAC address with a particular LAN) and identify which authentication process to use for the client 312 that is now requesting access to that LAN. That is, different networks can employ different authentication procedures (e.g., EAP-TLS, EAP-TTLS, etc.) and through the table lookup or other association process the authentication server 318 can determine which procedure to employ for each network. If the client 312 is successfully identified according to its network's authentication procedure, the AP 314 is instructed to allow the client access to LAN 316.

As part of the authentication process, the authentication server 318 may provide session or dynamic keys for use between the AP 314 and a client 312. The use of dynamic keys (rather than a static WEP key for an entire network) helps to further enhance the security of the WLAN. Because such keys are typically used for a much briefer time than is the case for a static WEP key, it is less likely than an unauthorized person can uncover the key and hijack the network. In fact, because such keys are unknown to the actual users of network 300 (i.e., the keys are only known by the AP 314 and the client 312) the most pervasive form of hacking a network, social engineering, is completely unavailable to potential hijackers.

In order for communications between the AP 314 and the authentication server 318 to take place, each device must be configured to use the same shared secret. A shared secret is a text string that serves as a password between a RADIUS client (in this case the AP 314) and a RADIUS server (i.e., authentication server 318). Shared secrets are used to verify that RADIUS messages, with the exception of the Access-Request message, are sent by a known device. Shared secrets also verify that the RADIUS message has not been modified in transit, and may also be used to encrypt some RADIUS attributes.

In conventional LANs, configuring a client and an authentication server to use the same shared secret usually involves a network administrator manually configuring each device by physically accessing each device and providing the text string that will serve as the password. Clearly, this approach is not viable in a situation where the authentication server is located remotely from the client and where, as here, the administrator of the network in which the RADIUS client (e.g., AP 314) is located may not even own or know the location of the authentication server 318. Thus, another approach is needed so that the AP 314 can be programmed with the correct shared secret.

Delivering the shared secret to the AP 314 using conventional Internet transmissions is a rather insecure approach that would seem to defeat the purpose of having a shared secret in the first place. One approach for ensuring the secure delivery of a shared secret which may therefore be employed is to use an "out-of-band" communication scheme such as described in U.S. patent application Ser. No. 10/640,433, entitled "METHOD FOR USING UNIQUE AUTHENTICATION INDICIA FOR COMPUTER SESSION", filed Aug. 12, 2003, assigned to the assignee of the present invention and incorporated herein by reference. Using such an out-of-band communication to securely deliver the shared secret to a network administrator of LAN 316 would help to ensure that the shared secret remains confidential and the administrator could then program AP 314 to use that shared secret when communicating with authentication server 318.

WEP Fallback Mode of Operation

The use of 802.1x authentication via a remote RADIUS server in accordance with the above-described techniques provides added security for a WLAN 320. In addition, the use of a remote authentication server 318 that may be shared by many different private network operators allows those operators to implement the added security at costs far less than would be required for individual network installations. However, problems with this approach to network authentication may be encountered if an AP 314 is unable to connect to the Internet 322 and/or the authentication server 318.

For example, if the AP's connection to the Internet 322 is unavailable for any reason, then new clients 312 will be unable to connect to the LAN 316 because the AP 314 will have no way to authenticate them. Similarly, if the authentication server 318 is off-line, the authentication process will fail and new clients 312 will be unable to connect to the LAN 316. Indeed, the problem may be compounded in situations where an AP 314 is required to re-authenticate with an authentication server 318 periodically, because in the event the AP 314 cannot reach the authentication server 318 for such re-authentication, all of an AP's 314 existing clients may have their access to the LAN 316 terminated.

In order to ensure that such situations do not result in the WLAN becoming unusable, the present invention provides for a fallback mode of operation for the APs 314 of a WLAN 320. In the fallback mode of operation (initiated whenever an AP 314 determines that an authentication server 318 is unreachable), APs 314 may revert to conventional 802.11 security measures by employing a WEP or WPA key (herein called a fallback WEP or WPA key) for communications between the AP 314 and its clients 312. In other cases, the APs 314 may revert to a mechanism which does not require authentication, for example, to a WPA Home mode in which a WPA pre-shared key (passphrase) is distributed instead of a WEP key. In the following paragraphs, although only WEP key distribution is discussed, the techniques are equally applicable to these other fallback mechanisms.

These fallback WEP/WPA keys may be distributed to the AP 314 by the authentication server 318 (which, in this case could be any server, whether on the customer premises or elsewhere, that has a communication channel to the authentication database) at the time an AP 314 is initially installed in a network 300 or, alternatively, when a client 312 initially connects to a WLAN 320. In some cases, the fallback keys may be unique for each client-AP pair. That is, in fallback mode an AP 314 may communicate with different ones of its clients 312 using different fallback keys. This is an improvement over conventional WEP processes in which a single WEP key is shared among all nodes 12 of a WLAN 20. Per-user fallback keys of the sort provided in accordance with the present invention offer added security because they remain valid only for a particular user-AP session, are unknown to other clients and to human users, and, because they are used only by one client, are less likely to be uncovered by a hacker through network sniffing.

To implement the use of multiple fallback keys, conventional AP firmware must be modified to permit the use of more than one key in a network 300. This is a relatively straightforward change and the individual fallback keys can be associated with different clients' MAC addresses (e.g., in a lookup table) at the AP 314 for use when needed. Alternatively, an entire WLAN 320 may utilize a single fallback WEP/WPA key and so long as such a key is not used for an extended period of time users of the WLAN may be fairly certain that their transmissions will remain secure.

In some cases, the authentication server 318 may be programmed to periodically provide updated fallback WEP keys to a WLAN 320 via an AP 314. For example, new fallback keys may be distributed hourly, daily, weekly, monthly or according to some other schedule. Alternatively, or in addition, APs 314 may be configured to retrieve new WEP keys whenever communication with an authentication server 318 is lost and then subsequently reestablished.

Note that because the fallback keys are used only within a WLAN 320, the authentication server 318 need not be the entity responsible for generating such keys. Any server or client 312 of a LAN 316 could be configured to provide this function. Indeed, even an AP 314 could be so configured. Thus, the use of fallback WEP keys in accordance with the present invention is not limited to the distribution of same via remote authentication servers 318.

Network Fallback Agent

In some cases, the AP 314 cannot store a fallback WEP key for use in the event of a communication failure with the remote authentication server. For example, most presently commercially available APs 314 are incapable of storing such information. Thus, another mechanism for storing and using such fallback keys may be needed.

Figure 5:
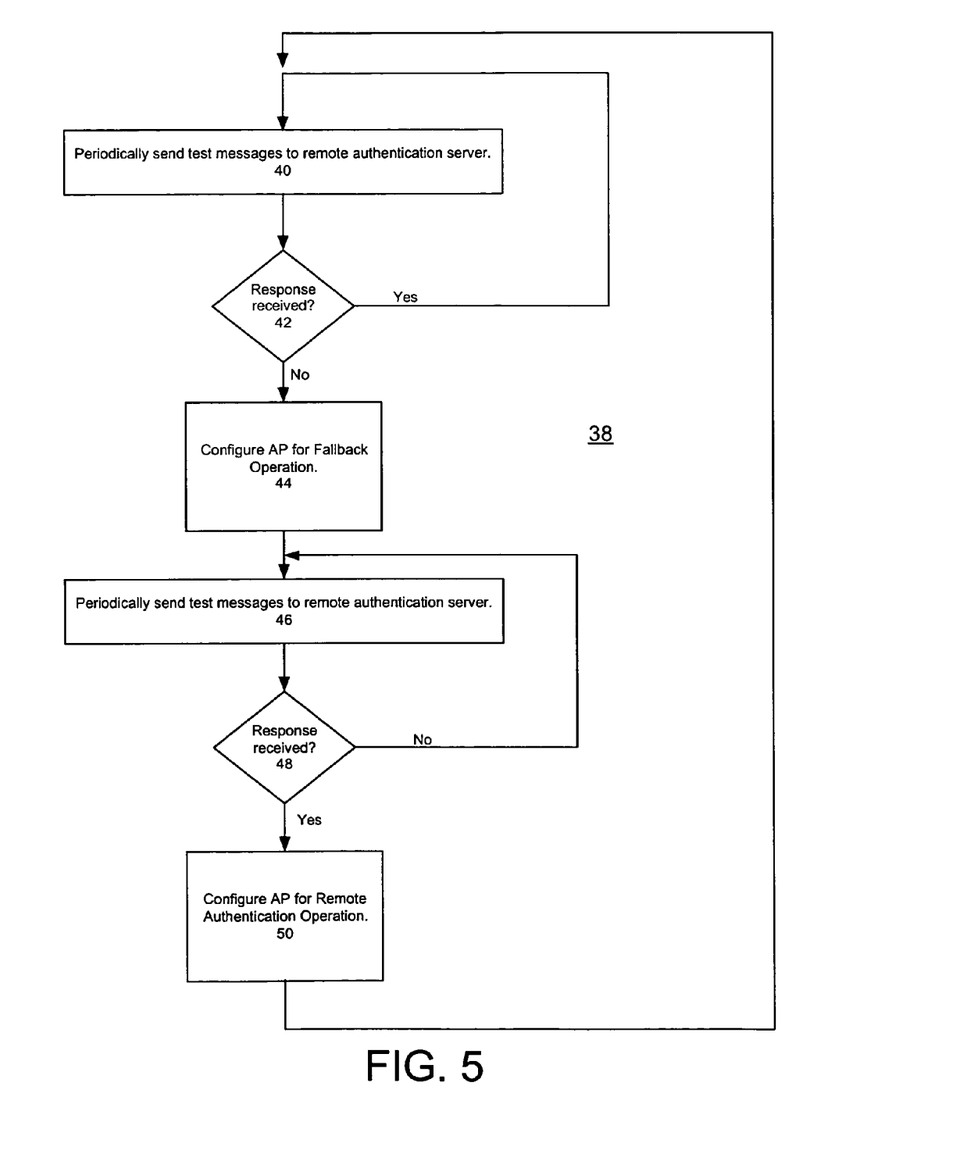
FIG. 5 illustrates an exemplary process performed by a network fallback agent, according to one embodiment of the present invention.

In accordance with an embodiment of the present invention, a network fallback agent is configured to recognize instances when use of the fallback key is required and is further configured to initiate procedures for its use. The network fallback agent may be instantiated as computer software running on a client 312 or server 318 of a LAN 316 that includes one or more APs 314 and which makes use of the remote authentication procedures discussed above. FIG. 5 illustrates a process 38 showing the primary activities performed by such an agent.

Assuming that the network is presently operating in accordance with the remote authentication procedures discussed above, at step 40 the network agent periodically tests the connection with the remote authentication server 318. Such a test may be performed using dummy requests for authentication, keep-alive messages or other short communications that will provide an indication of whether or not the network's connection to the authentication server 318 is available.

If a response from the authentication server 318 is received by the agent (step 42), this process continues indefinitely. However, when the agent fails to receive a response it initiates a fallback mode of operation with the network's WLAN(s) 320.

The fallback mode of operation is designed to allow wireless clients 312 uninterrupted access to network resources while still providing some protection for communications within the WLAN(s) 320. To initiate the fallback mode, the network agent configures the AP(s) 314 to use the fallback WEP key(s) previously obtained from the authentication server 318 (or possibly from another source, such as the network agent itself) (step 44). This process involves the network agent reconfiguring the AP(s) 314 through the HTTP and/or SNMP (or other) configuration interfaces. Such interfaces may be password protected (in which case the network agent would need to be provided with the appropriate password) and the reconfiguration involves providing the fallback key to the AP 314 for using in communicating with clients 312 of the WLAN 320.

The WLAN clients 312 themselves could be provided with the fallback key(s) at the same time (e.g., via an out-of-band transmission, such as a secure web page, from the network agent) or may have been provided with the fallback keys previously (e.g., at the time the keys were generated). Software at the client machines 312 could be easily configured to store such keys for use in programming local network interface cards in the event a client 312 loses communications with an AP 314 (as would occur when the AP 314 reverts to using a fallback WEP key).

Once the network agent has programmed the AP 314 to use the fallback WEP key, the network agent again reverts to periodically testing for restored communications with the remote authentication server 318 (step 46). This process continues indefinitely (step 48), until such communication is ultimately restored and the network agent then reprograms the AP 314 to use the remote authentication processes (step 50). Such reprogramming could again be accomplished through the use of the AP's 314 configuration interfaces and upon successful reconnection the authentication server 318 may generate new dynamic keys (and possibly fallback keys) for use within the WLAN 320. These keys could be distributed to the WLAN clients 312 through a re-authentication procedure that is transparent to the end users and is initiated either by the AP 314, the network agent or the remote server 318.

As indicated above, the network agent may be instantiated in any LAN client 312 or server 318 (e.g., a file server), but in one embodiment is instantiated as firmware of an AP 314. By providing an AP 314 with such functionality, no additional network software set up is necessary.

Since the fallback mode of operation impacts the security of the entire network, the fallback function should not be available to all users. Nevertheless, the network agent requires a significant amount of information regarding the network in order to initiate the fallback mode of operation. This includes administration passwords for the APs 314, and the fallback WEP key.

In order to protect this information it may be encrypted with a network password. The network owner may set this password and can share it with trusted users that should be able to initiate fallback operation. By having a separate password, the network owner is not required to be present to initiate a fallback operation. Also, by using such an encryption scheme, the vital network information is protected from individuals even if they have access to the machine on which the information is stored.

Dynamic WEP Keys

Earlier it was indicated that use of session keys instead of static WEP keys helps to ensure security of a WLAN because the keys are used only for a relatively short period of time, too short to permit a hacker from uncovering the key. Such dynamic WEP keys (or session keys) may be unique between an AP 314 and a client 312 (i.e., not shared among multiple clients 312 and a AP 314), and may be distributed by a remote authentication server 318 at a time a client 312 seeks admission to a network 300 (or periodic re-authentication), as discussed above.

Additionally, such keys may be distributed and used even in WLANs 320 that do not make use of a remote authentication server 318. Any server 318 (or client 312 or even an AP 314) of a LAN 316 could be programmed to generate dynamic keys for use between APs 314 and clients 312 and could distribute those keys in any of the fashions discussed above. For example, keys could be distributed to clients 312 in advance of a key change through secure in-band or out of band transmission. Out-of-band transmissions are favored because in the event a current key has been compromised, use of an out-of-band channel will help to ensure that the new key is not also uncovered. Keys may be distributed to APs 312 through the use of the APs' 312 programming interfaces (as discussed above). Schedules for key changes should be somewhat random in order to defeat attempts by unauthorized users to gain access to the WLAN 320.

Figure 6:
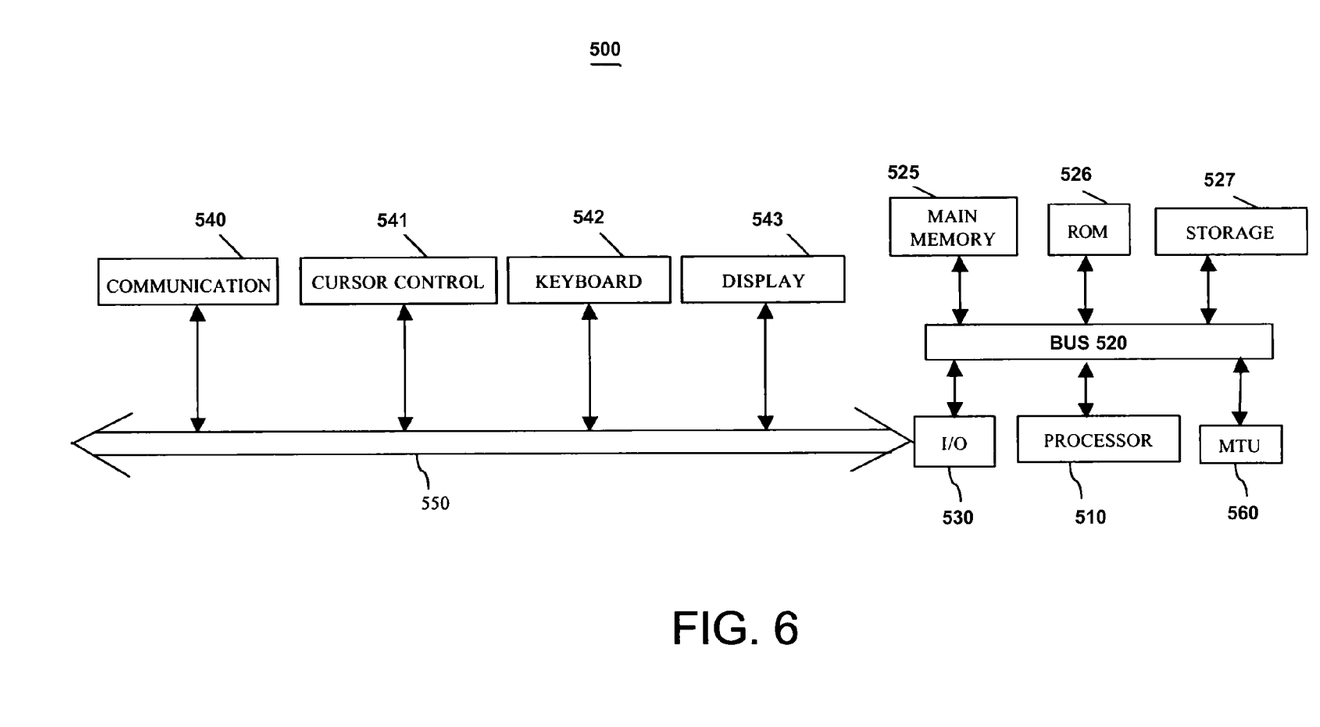
FIG. 6 illustrates an exemplary computer architecture, according to one embodiment of the present invention.

Having briefly described an exemplary network architecture 300 which employs various elements of the present invention, a computer system 500 representing exemplary clients 312, elements of access points 314, and/or servers (e.g., servers 318), in which elements of the present invention may be implemented will now be described with reference to FIG. 6.

One embodiment of computer system 500 comprises a system bus 520 for communicating information, and a processor 510 coupled to bus 520 for processing information. Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and/or other static storage device 526 coupled to bus 520 for storing static information and instructions used by processor 510.

A data storage device 527 such as a magnetic disk or optical disc and its corresponding drive may also be coupled to computer system 500 for storing information and instructions. Computer system 500 can also be coupled to a second I/O bus 550 via an I/O interface 530. Multiple I/O devices may be coupled to I/O bus 550, including a display device 543, an input device (e.g., an alphanumeric input device 542 and/or a cursor control device 541). For example, Internet information may be presented to the user on the display device 543.

The communication device 540 is for accessing other computers (servers or clients) via a network 316, 322. The communication device 540 may comprise a modem, a network interface card, a wireless chipset such as BlueTooth or 802.1x, or other well-known interface device, such as those used for coupling to Ethernet, token ring, or other types of networks.

Thus, fallback modes of operation within wireless computer networks have been described. It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A non-transitory computer-readable medium comprising instructions stored thereon to configure one or more processors of a wireless access point to:
   establish an association with a client computer system;
   obtain identification information from the client computer system;
   send the client computer system's identification information and a hardware-unique identifier of the wireless access point to an authentication server;
   authenticate the client computer system with the authentication server using an authentication process, wherein the hardware-unique identifier of the wireless access point is used to identify the authentication process to be used; and
   permit the client computer system to access a network after the client computer system is authenticated through the authentication process.

2. The non-transitory computer-readable medium of claim 1, wherein the hardware-unique identifier of the wireless access point comprises a media access control (MAC) address of the wireless access point.

3. The non-transitory computer-readable medium of claim 1, wherein the authentication server is accessible to the wireless access point by means of a network connection through a router.

4. The non-transitory computer-readable medium of claim 3, wherein the router performs network address translation.

5. The non-transitory computer-readable medium of claim 1, wherein the authentication server comprises a remote authentication dial-in user service (RADIUS) server.

6. The non-transitory computer-readable medium of claim 5, wherein the instructions to configure one or more processors to send the hardware-unique identifier of the wireless access point to the authentication server comprise instructions to configure the one or more processors to include the hardware-unique identifier within a RADIUS protocol attribute.

7. The non-transitory computer-readable medium of claim 1, wherein the instructions to configure one or more processors to permit the client computer system to access the network comprise instructions to configure the one or more processors to distribute dynamic keys, provided by the authentication server, for use in communications between the client computer system and the wireless access point.

8. A non-transitory computer-readable medium comprising instructions stored thereon to configure one or more processors of a client computer system of to:
    establish an association with a wireless access point;
    obtain a hardware-unique identifier from the wireless access point;
    perform an authentication process, mediated by the wireless access point, with an authentication server, wherein the hardware-unique identifier of the wireless access point is used to identify the authentication process to be used; and
    access network resources after the authentication process.

9. The non-transitory computer-readable medium of claim 8, wherein the hardware-unique identifier of the wireless access point comprises a media access control (MAC) address of the wireless access point.

10. The non-transitory computer-readable medium of claim 8, wherein the instructions to configure one or more processors to perform the authentication process further comprise instructions to configure the one or more processors to utilize a hardware-unique identifier of the client computer system.

11. The non-transitory computer-readable medium of claim 8, wherein the instructions to configure the one or more processors to allow the client computer system to access network resources comprise instructions to configure the one or more processors to cause the client computer system to utilize dynamic keys, provided by the authentication server, to communicate with the wireless access point.

12. A non-transitory computer-readable medium comprising instructions stored thereon to configure one or more processors of a wireless access point to:
    authenticate, using primary access control parameters associated with a first authentication process, one or more client computer systems with a remote authentication server for access to a network, wherein the primary access control parameters include a hardware-unique identifier of the wireless access point to identify the first authentication process to be used;
    determine the remote authentication server is unavailable after authenticating the one or more client computer systems; and
    authenticate, using secondary access control parameters associated with a fallback authentication process, another client computer system after determining the remote authentication server is unavailable, wherein the secondary access control parameters do not include the hardware-unique identifier of the wireless access point.

13. The non-transitory computer-readable medium of claim 12, wherein the hardware-unique identifier of the wireless access point comprises a media access control (MAC) address of the wireless access point.

14. The non-transitory computer-readable medium of claim 12, wherein the instructions to configure the one or more processors to authenticate the one or more client computer systems with the remote authentication server comprise instructions to configure the one or more processors to mediate an extensible authentication protocol with tunneled transport level security (EAP-TTLS) authentication process.

15. The non-transitory computer-readable medium of claim 12, wherein the instructions to configure the one or more processors to authenticate the one or more client computer systems with the remote authentication server comprise instructions to configure the one or more processors to mediate an extensible authentication protocol with transport level security (EAP-TLS) authentication process.

16. The non-transitory computer-readable medium of claim 12, wherein the remote authentication server comprises a RADIUS server.

17. A computer network authentication method, comprising:
    establishing an association with a client computer system by a wireless access point;
    obtaining, by the wireless access point, identification information from the client computer system;
    sending, by the wireless access point, the client computer system's identification information and a hardware-unique identifier of the wireless access point to an authentication server;
    authenticating, using an authentication process, the client computer system with the authentication server, wherein the hardware-unique identifier of the wireless access point is used to identify the authentication process to be used; and
    permitting the client computer system access to a network by the wireless access point after the act of authenticating.

18. A computer network authentication method, comprising:
    establishing an association with a wireless access point by a client computer system;
    obtaining, by the client computer system, a hardware-unique identifier from the wireless access point;
    authenticating the client computer system with an authentication server using an authentication process, wherein the act of authenticating is mediated by the wireless access point, and wherein the hardware-unique identifier of the wireless access point is used to identify the authentication process to be used; and
    accessing network resources by the client computer system that were blocked before the act of authenticating.

19. A computer network authentication method, comprising:
    authenticating, by a wireless access point, one or more client computer systems, for access to a network, with a remote authentication server using primary access control parameters associated with a first authentication process, wherein the primary access control parameters include a hardware-unique identifier of the wireless access point to identify the first authentication process;
    determining, by the wireless access point, the remote authentication server is unavailable after authenticating the one or more client computer systems; and
    authenticating, by the wireless access point, another client computer system using secondary access control parameters associated with a fallback authentication process after determining the remote authentication server is unavailable, wherein the secondary access control parameters do not include the hardware-unique identifier of the wireless access point.

20. The method of claim 19, wherein the secondary access control parameters are exchanged between the wireless access point and the one or more client computers prior to determining that the remote authentication server is unavailable.

21. The method of claim 19, wherein determining that the remote authentication server is unavailable is performed by a network fallback agent.

22. The method of claim 19, further comprising:
  testing, periodically, the connection to the remote authentication server after determining the remote authentication server is unavailable; and
  authenticating, using the remote authentication server and the first authentication process, subsequent client computer systems for access to the network after determining the remote authentication server is again available.

\* \* \* \* \*